I. F. BROWN.
Feeder for Cotton-Gins.
No. 220,336. Patented Oct. 7, 1879.
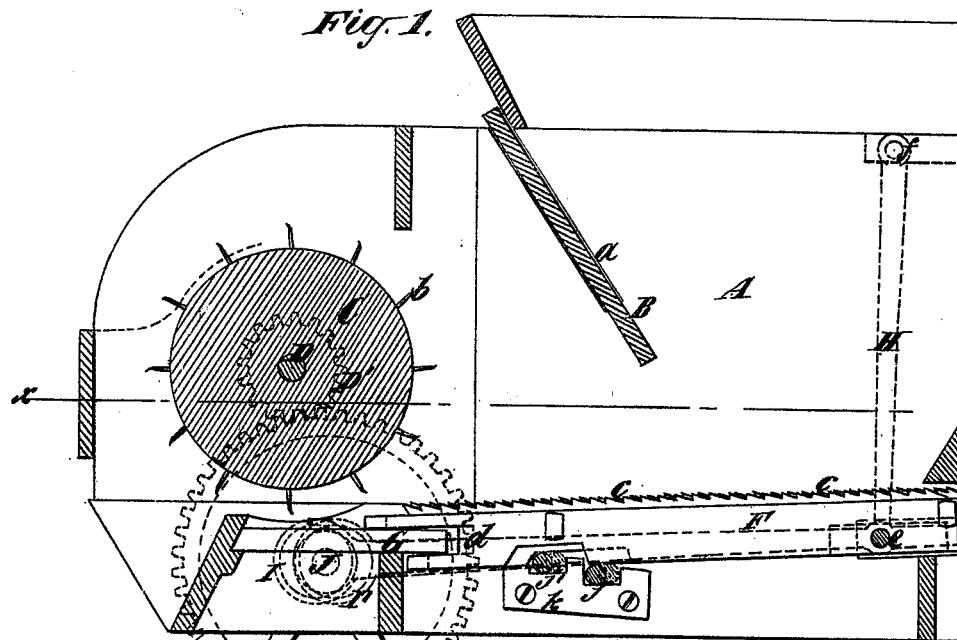
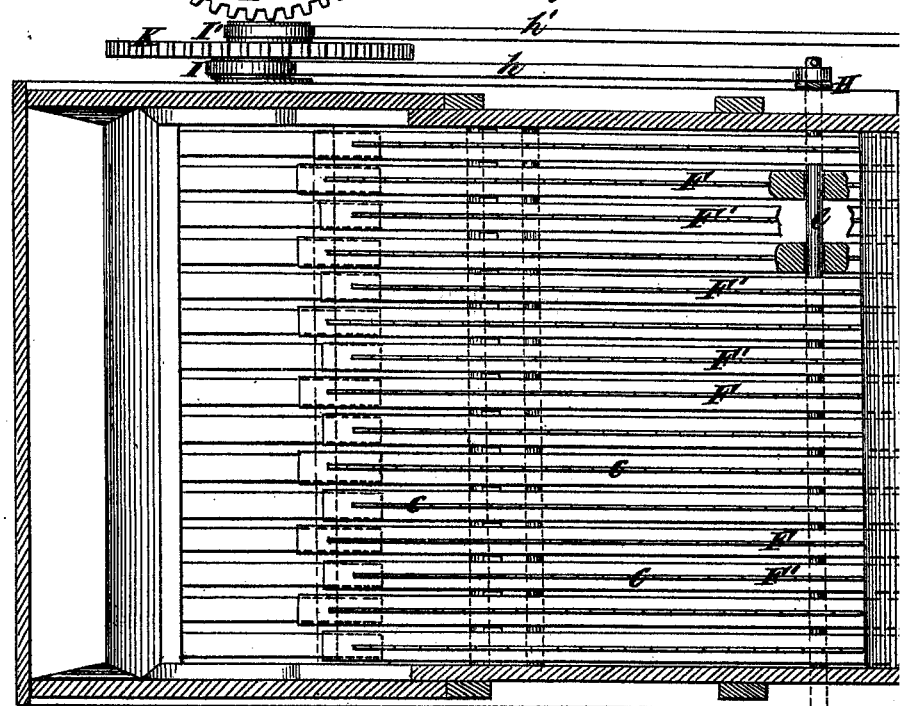

UNITED STATES PATENT OFFICE.

ISRAEL F. BROWN, OF NEW LONDON, CONNECTICUT, ASSIGNOR TO THE BROWN COTTON GIN COMPANY, OF SAME PLACE.

IMPROVEMENT IN FEEDERS FOR COTTON-GINS.

Specification forming part of Letters Patent No. 220,336, dated October 7, 1879; application filed June 17, 1879.

*To all whom it may concern:*

Be it known that I, ISRAEL F. BROWN, of New London, in the county of New London and State of Connecticut, have invented certain new and useful Improvements in Feeders for Cotton-Gins, of which the following is a specification.

This invention relates to feeding chambers or hoppers for cotton-gins, in which cotton is placed, and in the bottom of which is arranged means for feeding the cotton forward at a uniform rate to a rotary cylinder provided with teeth or pins, which cylinder carries the cotton directly to the gin; and the invention consists in the combination, with such a chamber or hopper rotary cylinder, and means for driving said cylinder, of a series of bars provided on their top faces with ratchet-shaped teeth or projections arranged in the bottom of said chamber, and means for reciprocating said bars, alternate bars being moved in one direction, while the intervening bars are moved in the opposite direction, and vice versa. By this arrangement certain of the bars are always feeding forward, whereby a continuous feed of cotton toward the rotary cylinder is produced, and the cotton is distributed evenly throughout the length of said rotary cylinder.

It also consists in a novel means of supporting the said reciprocating bars.

In the accompanying drawings, Figure 1 represents a longitudinal section of a cotton-gin feeder embodying my improvements; and Fig. 2, a horizontal section thereof on the dotted line $x\ x$, Fig. 1, the rotary cylinder being removed, and the gear-wheel and eccentrics upon one side of the machine, for operating the reciprocating bars, being in section, the better to illustrate my invention.

A designates the chamber or hopper of the feeder, into which cotton is first placed, and B, designates a board adjustable in guides in the sides $a$ of said chamber, and forming a gate, whereby the passage of cotton from said chamber or hopper may be regulated.

C designates a cylinder, provided upon its surface with teeth or pins $b$, and secured to a rotary shaft, D, so as to rotate therewith. The said shaft D may be provided with a pulley, through which motion may be imparted to it.

F F' designate two series of horizontally-arranged bars, situated at the lower part, and in this case forming the bottom of the chamber or hopper A, and provided upon their upper surfaces with ratchet-shaped teeth or projections $c$. These bars are all forked at one end, $d$, and their forked ends are supported upon the stationary bars G, in such manner that they may be moved horizontally. At or near the other end the alternate bars F have a rod, $e$, running through them, and supported by swinging links H, pivoted at $f$ to the chamber or hopper. The intervening bars, F, have a similar rod, $g$, running through them, and supported by swinging links H', similar to those marked H, and pivoted to the chamber or hopper at $f'$. All the bars of each series are notched in the under sides, so as to permit them to pass freely over the rods supporting the other series.

All the bars F and F' have imparted to them a reciprocating motion; and for the purpose of making the feed of the cotton perfectly uniform, the two series of bars are moved in opposite directions, the bars F being feeding forward, while the bars F' are moving back, and vice versa.

The means for imparting the requisite motion consists of eccentrics I I', mounted on the shaft J, opposite to each other, and connected to the two rods $e$ and $g$ by means of rods $h\ h'$.

Motion may be imparted to the shaft J through a gear-wheel, K, mounted on said shaft, with which engages a pinion, D', upon the driving-shaft D.

The bars F and F' may be kept at a proper distance apart by means of blocks interposed between and secured to them.

In order that little power may be required to operate the reciprocating bars, I place below them rollers $j\ j'$, upon which the two series F F' are supported. In order that each series of bars may clear the roller upon which the other series is supported, I arrange the said rollers at different levels, and the bars of each series are notched to clear the bars of the other series. The said rollers are supported at each end in a notched bearing-plate, $k$, so that they may roll backward and forward with the motion of the reciprocating bars.

It is obvious that as certain of the reciprocating bars are at all times moving toward the rotary cylinder, the cotton is fed toward and over said cylinder to the gin at a uniform feed.

What I claim as my invention, and desire to secure by Letters Patent, is—

1. In a cotton-gin feeder, the combination, with a chamber or hopper, a rotary cylinder, and means for driving said cylinder, of a series of bars provided on their upper faces with ratchet-shaped teeth or projections, and means for reciprocating said bars, alternate bars being moved in one direction, while intervening bars are moved in the other direction, substantially as specified, whereby cotton is carried forward to the rotary cylinder and evenly distributed throughout its length.

2. The combination, with the two series of bars F F' and means for alternately reciprocating them in opposite directions, of the roller $j\ j'$, supporting said bars and arranged at different levels, the bars of each series being notched on their under sides, substantially as described, so as not to bear upon the roller supporting the bars of the other series.

ISRAEL F. BROWN.

Witnesses:
   E. T. BROWN,
   GEORGE COLFAX.